United States Patent
Herman

(10) Patent No.: US 11,490,023 B2
(45) Date of Patent: Nov. 1, 2022

(54) SYSTEMS AND METHODS FOR MITIGATING LIGHT-EMITTING DIODE (LED) IMAGING ARTIFACTS IN AN IMAGING SYSTEM OF A VEHICLE

(71) Applicant: Ford Global Technologies, LLC, Dearborn, MI (US)

(72) Inventor: David Herman, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 17/085,667

(22) Filed: Oct. 30, 2020

(65) Prior Publication Data

US 2022/0141368 A1    May 5, 2022

(51) Int. Cl.
*H04N 5/235* (2006.01)
*H04N 5/232* (2006.01)
*H04N 7/18* (2006.01)
*G06V 20/58* (2022.01)

(52) U.S. Cl.
CPC ......... *H04N 5/2351* (2013.01); *G06V 20/584* (2022.01); *H04N 5/23206* (2013.01); *H04N 7/181* (2013.01); *H04N 7/188* (2013.01)

(58) Field of Classification Search
CPC .. H04N 5/2351; H04N 5/23206; H04N 7/181; H04N 7/188; G06V 20/584
USPC ...................................... 348/207.99
See application file for complete search history.

(56) References Cited

U.S. PATENT DOCUMENTS

| | | |
|---|---|---|
| 2015/0138324 A1* | 5/2015 | Shirai .................. H04N 13/296 348/47 |
| 2016/0373684 A1 | 12/2016 | Sherman et al. |
| 2018/0109715 A1 | 4/2018 | Mangla et al. |
| 2018/0309295 A1* | 10/2018 | Fukunaga ................. H02J 3/28 |

FOREIGN PATENT DOCUMENTS

WO    2018056070 A1    3/2018

* cited by examiner

*Primary Examiner* — Yogesh K Aggarwal
(74) *Attorney, Agent, or Firm* — Frank Lollo; Eversbeds Sutherland (US) LLP

(57) ABSTRACT

This disclosure is generally directed to mitigating light-emitting diode (LED) imaging artifacts in an imaging system of a vehicle. In an example embodiment, the imaging system includes a first camera that operates under control of a first pulse trigger sequence, and a second camera that operates under control of a second pulse trigger sequence. The second pulse trigger sequence has a temporal offset with respect to the first pulse trigger sequence. The first camera captures an image of a light source, such as a traffic light containing LEDs. This image may contain an LED imaging artifact indicating that the traffic light is off. The second camera also captures an image of the light source. The temporal offset of the second pulse trigger sequence may eliminate the LED imaging artifact in the second image. A controller may compare the two images and determine that the traffic light is actually on.

18 Claims, 6 Drawing Sheets

SYSTEMS AND METHODS FOR MITIGATING LIGHT-EMITTING DIODE (LED) IMAGING ARTIFACTS IN AN IMAGING SYSTEM OF A VEHICLE

FIELD OF THE DISCLOSURE

This disclosure generally relates to operations associated with a vehicle and more particularly relates to mitigating LED imaging artifacts in images captured by an imaging system of a vehicle or other device, such as a smartphone or the like.

BACKGROUND

Light-emitting diodes (LEDs) offer several advantages in comparison to incandescent bulbs and have therefore been incorporated into a variety of lighting fixtures, such as streetlights, traffic lights, and billboards. The light intensity emitted by the light-emitting diodes in most of these fixtures is controllable by powering the light-emitting diodes with a voltage having a pulse waveform. The duty cycle and/or the pulse repetition frequency of the pulse waveform can be varied to in order to vary the amount of light emitted by each LED.

The pulse repetition frequency is typically selected such that human eyes do not notice a flickering of the LED when the LED toggles between on and off states. However, a digital imaging camera mounted on a vehicle may, in at least some cases, produce images having imaging artifacts that are characterized as LED flicker. In some cases, a vehicle controller of the vehicle may interpret the LED flicker of a red traffic light as the traffic light being off when the red light is on. The vehicle controller may also present an image of the flickering red traffic light on a display screen in the vehicle, which can be annoying to the driver.

Some conventional approaches to solving the problem of LED flicker in vehicles have focused on the use of hardware solutions, such as LOFIC (lateral overflow integration capacitor), image processing solutions, such as chopping (adding components to filter the image signal), and image capture strategies, such as split pixel imaging that captures an image of a scene simultaneously instead of sequentially.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
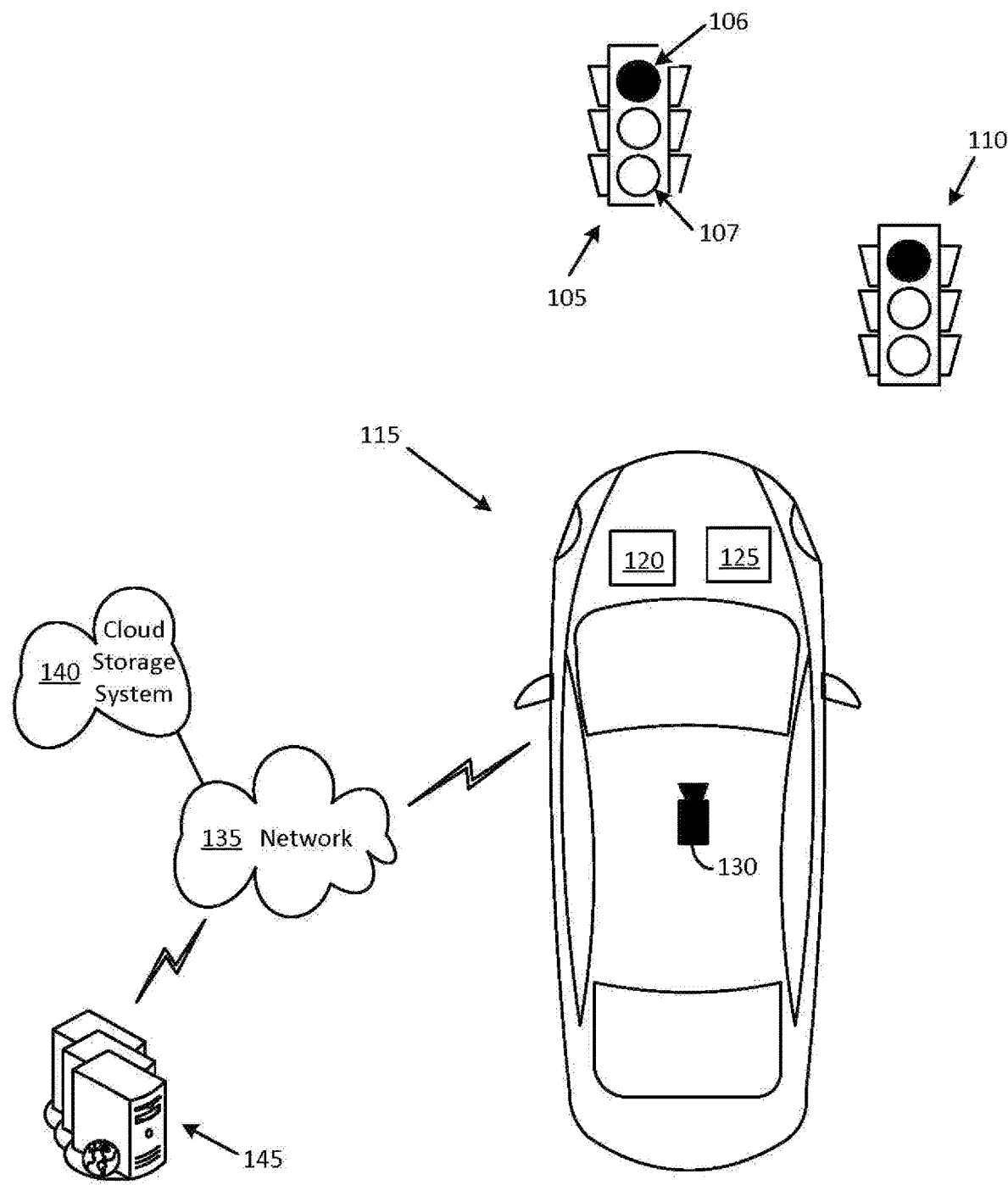
FIG. 1 shows an example vehicle that includes an imaging system for capturing images of various types of light sources in accordance with an embodiment of the disclosure.

In terms of a general overview, certain embodiments described in this disclosure are directed to systems and methods for mitigating light-emitting diode (LED) imaging artifacts in an imaging system of a vehicle. In an example embodiment, the imaging system includes a first camera that operates under control of a first pulse trigger sequence. The first pulse trigger sequence is a part of a first pulse trigger mode of operation. A second camera of the imaging system operates under control of a second pulse trigger sequence. The second pulse trigger sequence, which is a part of a second pulse trigger mode of operation, has a temporal offset with respect to the first pulse trigger sequence. The first camera captures an image of a light source. In an example scenario, the light source is a traffic light containing light-emitting diodes that are toggled on and off in rapid succession when the traffic light is in an on state. The image captured by the first camera may contain an LED imaging artifact erroneously indicating that the traffic light is off. The second camera also captures an image of the light source. The temporal offset of the second pulse trigger sequence may eliminate the LED imaging artifact in the image captured by the second camera. A controller may compare the two images and determine that the traffic light is actually on.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. It should be understood that the examples provided below are directed at traffic lights for explaining principles in accordance with the disclosure. However, these principles can be equally applicable to objects other than traffic lights that incorporate LEDs and lighting elements (bulbs, for example) that are toggled on and off. A few examples of such objects may include household bulbs, streetlights, commercial lighting, traffic lights, and billboards. It should also be understood that the word "example" as used herein is intended to be non-exclusionary and non-limiting in nature.

FIG. 1 shows an example vehicle 115 that includes an imaging system for capturing images of various types of light sources. Although illustrated as a sedan, the vehicle 115 may take the form of another passenger or commercial automobile, such as, for example, a truck, a high-performance vehicle, a crossover vehicle, a van, a rickshaw, a jeepney, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components, such as a transmission, a drive shaft, a differential, etc. In some instances, the imaging system may be independent of the vehicle. For example, imaging system may be part of a phone/camera of a mobile device that is brought into a vehicle. That is, the systems and methods described herein can apply to portable camera devices, such as mobile devices, smartphones, wearables, etc.

In some cases, the vehicle 115 may be an electric vehicle (EV) that includes a battery EV (BEV) drive system, a hybrid electric vehicle (HEV) having an independent onboard powerplant, or a plug-in hybrid electric vehicle (PHEV) that includes a HEV powertrain connectable to an external power source and/or includes a parallel or series hybrid powertrain having a combustion engine powerplant and one or more EV drive systems. HEVs may further include battery and/or supercapacitor banks for power storage, flywheel power storage systems, or other power generation and storage infrastructure.

In some other cases, the vehicle 115 may be a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

It must be understood that irrespective of the type of engine, fuel, or energy source used, the vehicle 115 in accordance with disclosure can be any vehicle having two or more cameras arranged to perform the various functions described herein. Such vehicles can include any vehicle conforming to any of six levels of driving automation defined by the Society of Automotive Engineers (SAE). The six levels of driving automation range from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations, such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation.

The vehicle 115 may include various components, such as, for example, a vehicle computer 120, an imaging system controller 125, a camera 130, and a wireless communication system (not shown). The imaging system controller 125 and the camera 130 are two example components of an imaging system of the vehicle 115 that is used to capture images. The vehicle computer 120 may perform various functions, such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). In some cases, the vehicle computer 120 may include more than one computer.

In an example implementation in accordance with the disclosure, the imaging system controller 125 may be configured to support wireless communications with a server computer 145 and/or a cloud storage system 140 via a network 135. The network 135 may be, and/or include, the Internet, a private network, public network or other configuration that operates using any one or more known communication protocols, such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies, such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The server computer 145 and/or cloud storage system 140 may provide to the imaging system controller 125, various types of information that may be pertinent to mitigating LED imaging artifacts in accordance with the disclosure. Some examples of such information can include timing characteristics of light sources, such as traffic lights and road signs.

The vehicle computer 120 may be installed in an engine compartment of the vehicle 115 (or elsewhere in the vehicle 115) and communicatively coupled to the imaging system controller 125. In some implementations, the imaging system controller 125 may be a part of the vehicle computer 120.

The camera 130 may be mounted upon any component of the vehicle 115, such as, for example, the hood of the vehicle 115, a dashboard of the vehicle 115, or a roof of the vehicle 115 (as shown). The camera 130 may be a digital camera that captures digital images at an image capture rate that is controllable by the imaging system controller 125. In this example embodiment, the camera 130 is generally oriented to capture images of objects around the vehicle 115. Images and/or video generated by the camera 130 may be displayed on a display screen of an infotainment system provided in the vehicle 115 for viewing by an occupant of the vehicle 115 and/or provided to the imaging system controller 125 for generating images and/or information that may be upon the display screen of the infotainment system. When the vehicle 115 is an autonomous vehicle, the imaging system controller 125 may evaluate the images and/or video for purposes of automatically controlling various operations of the vehicle.

The images captured by the camera 130 typically include driving-related objects, such as, for example, traffic lights, road signs, pedestrians, obstacles, and crosswalks. LED imaging artifact mitigation procedures and systems in accordance with the disclosure particularly involve imaging of various light sources, such as, for example, a traffic light, a road sign, a pedestrian sign, and/or a light mounted on a second vehicle (a brake light, for example). The imaging system controller 125 may evaluate an image of a traffic light, such as, for example, a traffic light 105 to determine whether a red warning light 106 of the traffic light 105 is on. The red warning light 106 may include LEDs that are toggled on and off when the red warning light 106 is on at which time, the imaging system controller 125 may cooperate with the vehicle computer 120 to stop the vehicle 115. On the other hand, when the red warning light 106 is off and a green light 107 of the traffic light 105 is on, the imaging system controller 125 may cooperate with the vehicle computer 120 to move the vehicle 115 forward.

The imaging system controller 125 may also evaluate an image of another traffic light 110 in order to determine if a green light is on in the traffic light 110 indicating that it is safe for the vehicle 115 to move forwards and make a right turn.

In another scenario, the imaging system controller 125 may evaluate an image of a road sign providing a driving warning, such as, for example, "Watch out for accident 3.1415926 miles ahead." The words may be displayed by LEDs incorporated into the road sign, and the imaging system controller 125 may mitigate any LED artifacts if present in images of the road sign that are captured by the camera 130.

In yet another scenario, the imaging system controller 125 may evaluate an image of a billboard incorporating LEDs, mitigate any LED artifacts if present in the image, and generate a customized message that is displayed on the display screen of the infotainment system in the vehicle 115.

Figure 2:
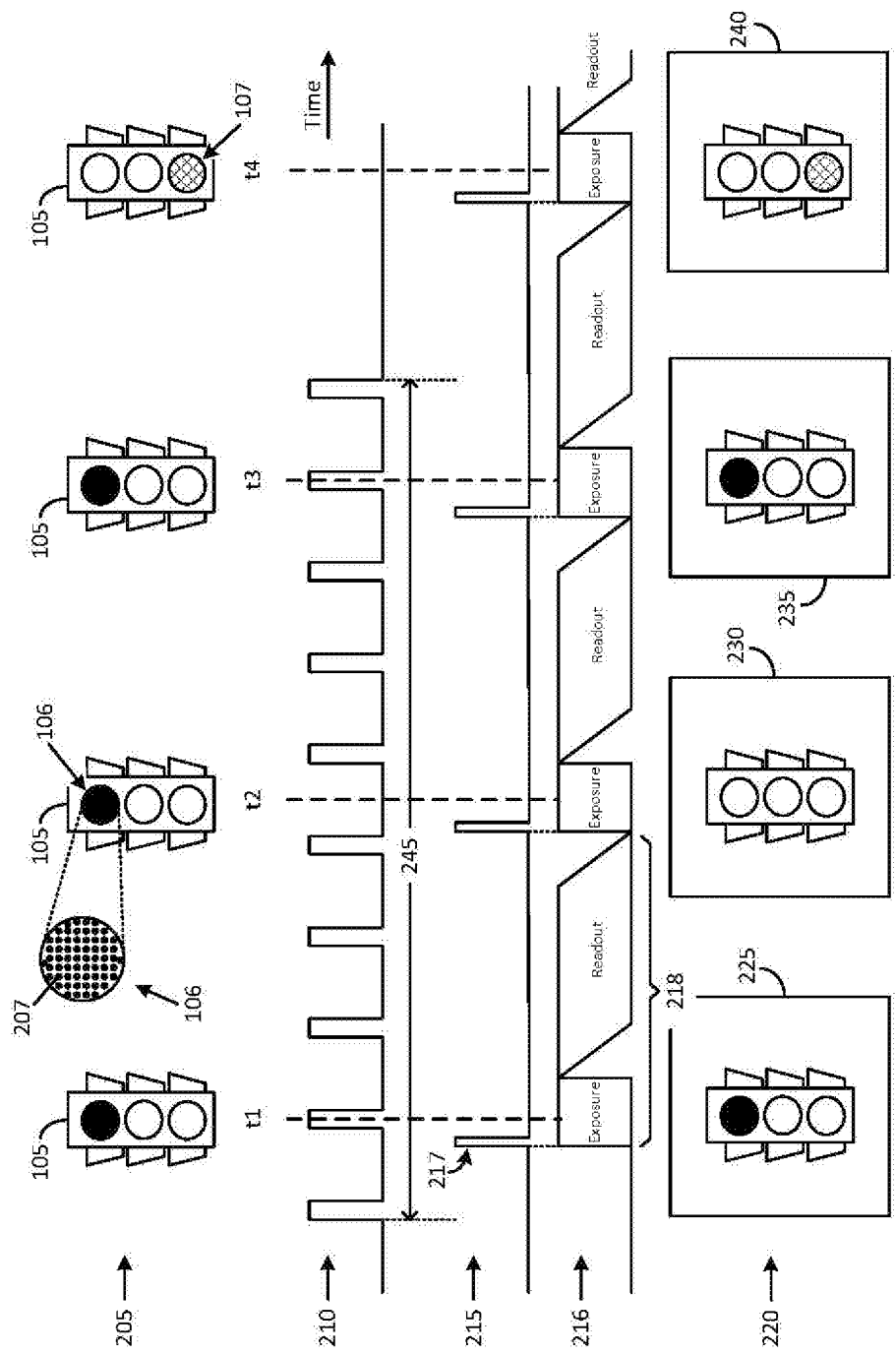
FIG. 2 illustrates a scenario in which the imaging system of FIG. 1 generates an LED imaging artifact.

FIG. 2 illustrates a scenario in which the imaging system provided in the vehicle 115 generates an LED imaging artifact. In this scenario, the red warning light 106 of the traffic light 105 is currently on (as indicated by an illumination status 205 shown in FIG. 2). The red warning light 106 contains a set of LEDs. The set of LEDs includes an example LED 207. The LEDs in the red warning light 106 are activated upon application of power to the red warning light 106. The applied power is illustrated in the form of a pulsed waveform 210 that causes each of the LEDs in the red warning light 106 to toggle between an on state and an off state. The toggling rate is typically indiscernible to a human driver because the human eye cannot perceive very rapid light changes in the LEDs and/or the human brain adapts to such light changes. However, a machine-vision apparatus, such as a camera used in a vehicle, may register the flickering and draw erroneous conclusions in some cases with respect to a traffic light.

The pulsed waveform 210 contains a series of pulses that go to a high level to cause the LEDs to turn on, and drop to a low level to turn off the LEDs. Various characteristics of the pulsed waveform 210 such as, for example, a duty cycle, phase, and/or a pulse repetition frequency (prf), can be tailored in order to control the light intensity produced by the LEDs. For example, increasing a pulse width of each of the pulses in the pulsed waveform 210 increases the average voltage level of the pulsed waveform 210, thereby causing the LEDs to shine brighter, and vice-versa.

In the example scenario illustrated in FIG. 2, the LEDs of the red warning light 106 are turned on, for example, at a timing instant "t1" and a timing instant "t3" and are turned off at a timing instant "t2." The pulses of the pulsed waveform 210 persist for a time period 245 corresponding to a period of time over which the red warning light 106 is on, and disappear when power is disconnected from the red warning light 106, such as, for example, when power is applied to a green light 107 of the traffic light 105 instead.

The imaging system controller 125 may configure the camera 130 to capture images of the traffic light 105 and/or the traffic light 110 based on various camera settings. In an exemplary camera setting in accordance with the disclosure, the imaging system controller 125 configures the camera 130 to operate in an image capture mode wherein a pulse trigger sequence 215 is used to trigger a sequence of image capture cycles. Each image capture cycle may be initiated by a transition edge of a respective pulse in the pulse trigger sequence 215. For example, an image capture cycle 218 is triggered by a rising edge of a pulse 217 of the pulse trigger sequence 215. Other image capture cycles are sequentially triggered by the rising edges of other sequentially occurring pulses in the pulse trigger sequence 215. Each image capture cycle includes an exposure period and a readout period. The exposure period may be varied by the imaging system controller 125 either automatically (depending on parameters such as, for example, camera hardware and/or ambient light conditions) or under control of a software program. In an example implementation, the imaging system controller 125 may execute a software program to tailor the exposure period of the image capture cycles in order to mitigate imaging artifacts in accordance with an embodiment of the disclosure.

Various characteristics of the pulse trigger sequence 215 such as, for example, the duty cycle and the pulse repetition frequency (prf), can be varied by the imaging system controller 125 in order to control the exposure periods. In the example scenario illustrated in FIG. 2, the camera shutter is open at each of the timing instants "t1," "t2," and "t3." At these timing instants, light associated with an image to be captured enters the lens of the camera 130 and is incident upon an image sensor contained inside the camera 130. The captured image in this example, includes the traffic light 105. The status of the images captured by the camera 130 at the timing instants "t1," "t2," and "t3" are indicated by the imaging status 220. At timing instant "t1" the pulsed waveform 210 is in a high state thus causing the LEDs of the red warning light 106 to be in an on state. The image capture sequence 216 at timing instant "t1" corresponds to an exposure period and the imaging sensor in the camera 130 captures an image 225. Consequently, as shown by the imaging status 220, the image 225 captured by the camera 130 at the timing instant "t1" includes the red warning light 106 in an illuminated condition (all LEDs including the LED 207 are in an on state).

Similarly, at timing instant "t3" the pulsed waveform 210 is in a high state thus causing the LEDs of the red warning light 106 to be in an on state. The image capture sequence 216 at timing instant "t3" corresponds to an exposure period and the imaging sensor in the camera 130 captures an image 235. Consequently, as shown by the imaging status 220, the image 235 captured by the camera 130 at the timing instant "t3" includes the red warning light 106 in an illuminated condition (all LEDs including the LED 207 are in an on state).

However, at timing instant "t2" the pulsed waveform 210 is in a low state whereby the LEDs of the red warning light 106 are off. The image capture sequence 216 at timing instant "t2" corresponds to an exposure period and the imaging sensor in the camera 130 captures an image 230 of the red warning light 106 in an off state. The imaging status 220 shows the image 230 captured by the camera 130 at the timing instant "t2" includes the red warning light 106 in a non-illuminated condition (all LEDs including the LED 207 are in an off state).

In reality, the red warning light 106 is still in an illuminated condition (all LEDs including the LED 207 are merely off momentarily as a result of the rapid toggling caused by the pulsed waveform 210). The image 230 represents an LED imaging artifact because the image does not accurately reflect the status of the traffic light 105 as would be perceived by a human driver observing the traffic light 105.

It is desirable in accordance with the disclosure for the imaging system controller 125 to evaluate the image 230 in comparison with other images, such as, for example, the image 225 and the image 235. In one example embodiment, an illumination condition of the red warning light 106 is determined by comparing a first status of the red warning light 106 in the image 230 and a second status of the red warning light 106 in the image 235. In another example embodiment, an illumination condition of the LED 207 may be determined by comparing a first status of the LED 207 in the image 230 and a second status of the LED 207 in the image 235. In yet another example embodiment, an LED imaging artifact may be identified by a majority polling procedure applied to a preselected number of images, such as, for example, one image that is different in comparison to 10 other neighboring images over a time frame. The neighboring images may precede and/or succeed the image associated with the LED imaging artifact.

A time frame for evaluating the various images using any of the procedures indicated above can correspond, for example, to the time period 245, or can correspond to any other time period during which an adequate number of images have been captured. The time frame can also be selected on the basis of various factors, such as, for example, one or more image capture settings on the camera 130, a frame repetition rate of the pulse trigger sequence 215, and/or an expected duration for the red warning light 106 to stay on. In some cases, if not known, the frame repetition rate of the pulsed waveform may be estimated by the imaging system controller 125 via communications with other devices that are connected to the electrical grid. Furthermore, in some cases, the camera 130 can be a rolling shutter camera and individual images captured by the rolling shutter camera may be evaluated in order to detect any banding features, if present, inside the image frame. Such banding features may suggest the occurrence of flicker at higher rates than the image frame row exposure duration and row to row temporal offset during readout.

At timing instant "t4" the pulsed waveform 210 remains at a steady low state because the red warning light 106 has been turned off and power has been applied to another light, such as the green light 107. At this time, the camera 130 captures an image 240 that accurately reflects the red warning light 106 in an unlit condition.

In some cases, the camera may utilize a rolling shutter mode of operation wherein each row of the camera's exposure is read out sequentially, which leads to a temporal offset in each row as the exposure of the first row is slightly delayed compared to the next row and so on. It must be understood that the shape of the image capture sequence 216 shown in FIG. 2 is merely for purposes of illustration. In some other cases, the exposure period may be illustrated by a different shape, such as, for example, a parallelogram. A vertical dimension of the parallelogram may be indicated as a temporal-row axis and a row position of a light source can indicate whether the light source is on or off. Furthermore, a light source may be either on, dimmer, or off, based on the duration of the exposure relative to the duration of light produced by the light source. In some implementations, the time period 245 can represent one frame in a repetitive frame format of operation. In some cases, no time gap may be present between frames and in some other cases an inter-frame time gap may be provided. The inter-frame time gap may be adjusted to affect a smaller readout period. The camera 105 may also be operated at a frame rate that is not constant and the exposure periods adjusted so as to produce a higher frame rate.

Figure 3:
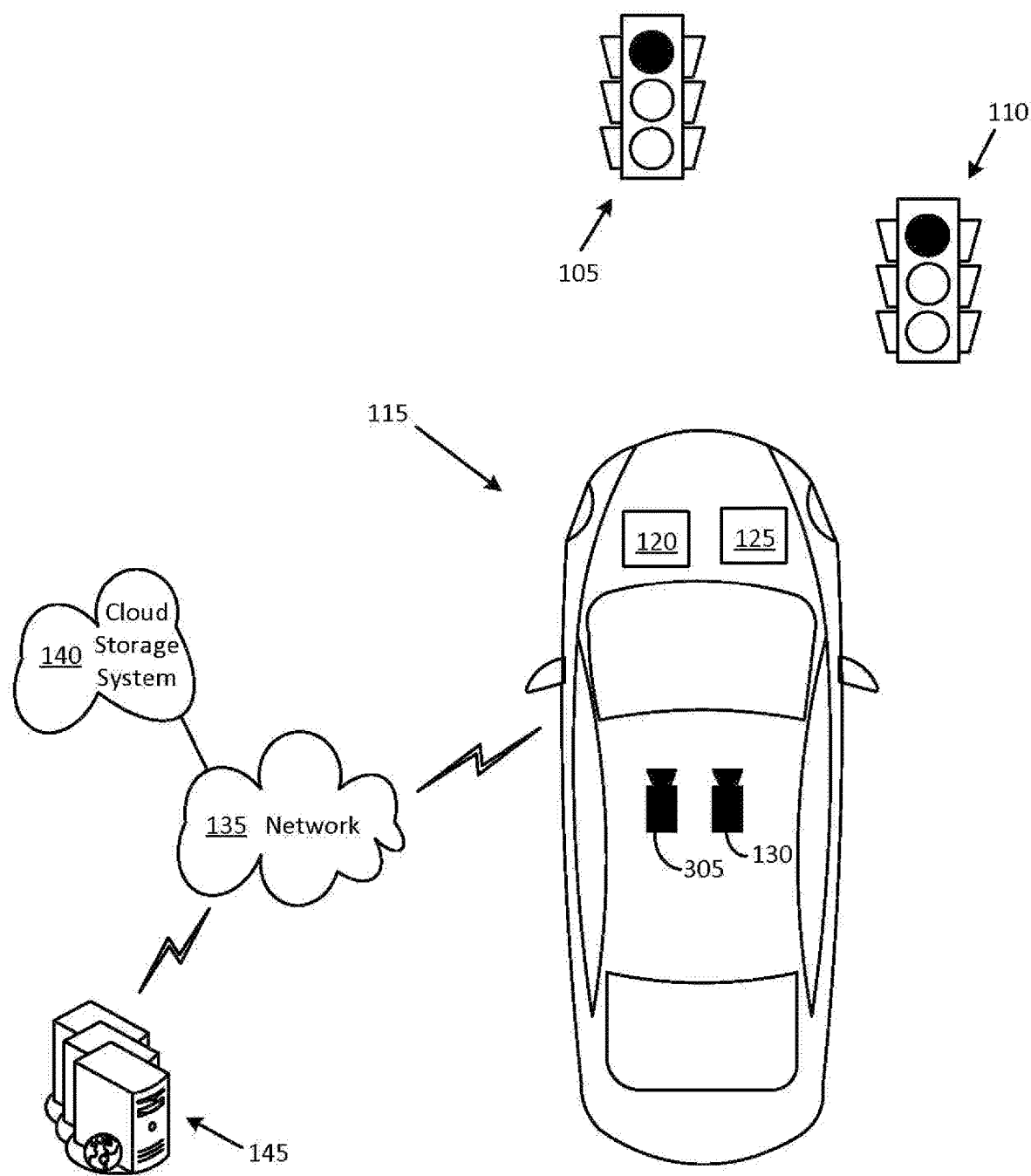
FIG. 3 shows an example vehicle that includes an imaging system for capturing images of various types of light sources in accordance with an embodiment of the disclosure.

FIG. 3 shows the vehicle 115 equipped with an imaging system that includes two cameras for capturing images of various types of light sources in accordance with an embodiment of the disclosure. In this embodiment, the vehicle 115 may include various components, such as, for example, the vehicle computer 120, the imaging system controller 125, the camera 130, and the wireless communication system. The imaging system of the vehicle can include various components, such as, for example, the camera 130 and the imaging system controller 125 and further include a second camera 305. In other embodiments, the imaging system can include more than two cameras. The field of view of each of multiple cameras, may be arranged to overlap so as to provide a desired cumulative field of view. Some or all of the cameras may also include objects such as wide-angle lenses and filters.

Figure 4:
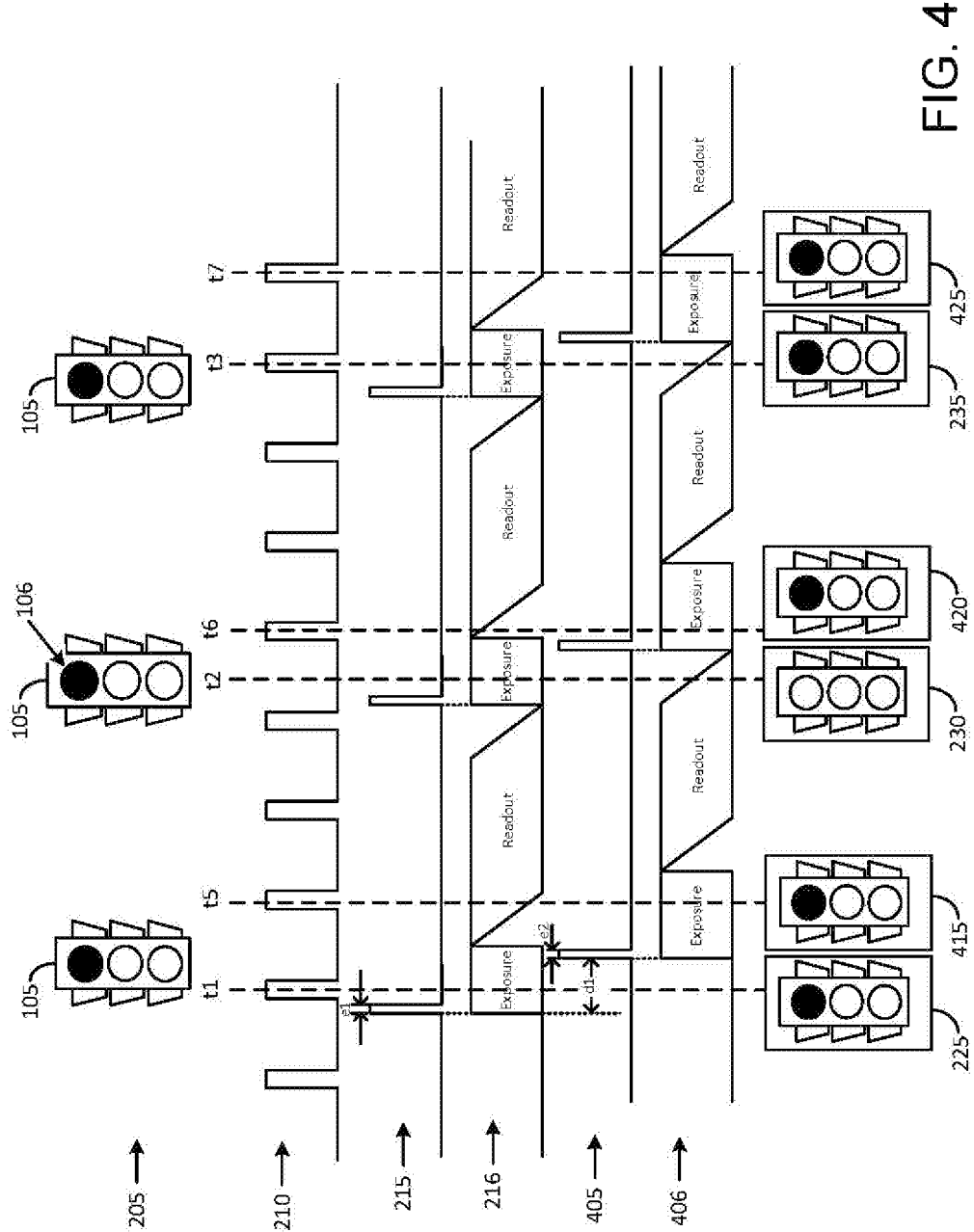
FIG. 4 illustrates a mitigation of the LED imaging artifact of FIG. 2 by the imaging system illustrated in FIG. 3.

FIG. 4 illustrates a scenario wherein the camera 130 and the camera 305 shown in FIG. 3 are employed for identifying and mitigating LED imaging artifacts in accordance with the disclosure. More than two cameras can be employed in other applications in accordance with the disclosure. It must be understood that elements indicated in FIG. 4 by the same reference numerals as used in FIG. 2 are identical to each other. For example, the pulsed waveform 210, the pulse trigger sequence 215, and the image capture sequence 216 shown in FIG. 4 are identical to the pulsed waveform 210, the pulse trigger sequence 215, and the image capture sequence 216 shown in FIG. 2.

The pulse trigger sequence 215 is used for triggering the image capture sequence 216 in the first camera 130. The pulse trigger sequence 405 is used for triggering the image capture sequence 406 in the second camera 305. The pulse trigger sequence 405 and/or the image capture sequence 406 may be identical to, similar to, or different than, the pulse trigger sequence 215 and/or the image capture sequence 216, respectively. For example, a pulse width "e2" of each pulse in the pulse trigger sequence 405 can be identical to, similar to, or different than, a pulse width "e1" of each pulse in the pulse trigger sequence 215.

However, a temporal offset is provided between the pulse trigger sequence 215 and the pulse trigger sequence 405 in accordance with the disclosure. The temporal offset is illustrated in FIG. 4 by a temporal offset "d1" between a leading edge of the first pulse in the pulse trigger sequence 215 and a leading edge of the first pulse in the pulse trigger sequence 405. The temporal offset may be provided in various ways. In one example implementation, the temporal offset can be provided by employing a different pulse repetition frequency (prf) and/or a duty cycle for the pulse trigger sequence 405 in comparison to the pulse repetition frequency (prf) and/or duty cycle employed for the pulse trigger sequence 215. In another example implementation, the temporal offset can be provided by using a delay element (a D-flipflop, for example) to apply a signal delay upon the pulse trigger sequence 405 with respect to the pulse trigger sequence 215. In yet another example implementation, the temporal offset "d1"

A time period of the temporal offset "d1" to be applied may be determined in various ways. In one example application, the temporal offset "d1" may be a fraction of the time period 245. In another example application, the temporal offset "d1" may be calculated on the basis of a desired amount of delay in various aspects of a rolling shutter mode of operation such as, for example, row readout times, a number of rows between an image that is present in adjacent frames, and trigger delay between start of frame captures in multiple cameras.

In some cases, the imaging system controller 125 may determine the temporal offset "d1" by wirelessly fetching from the server computer 145 and/or the cloud storage system 140, some timing parameters associated with the pulsed waveform 210. For example, the imaging system controller 125 may obtain from the server computer 145 and/or the cloud storage system 140, timing sequence information related to red, amber, and green lights of the traffic light 105. Specifically, in this example we may determine the alternating current (AC) grid frequency and offset at that location to estimate the grid connected traffic light 105 timing sequence information. In another example, a vehicle manufacturer may utilize a PWM controller of a specific timing settings wherein the temporal offset may not be known a priori but the frequency may be estimated on the basis of vehicle model recognition from the image captured.

In an example application, the temporal offset "d1" is a fixed offset that is time-invariant. In another example application, the temporal offset "d1" may be varied periodically and/or intermittently over time. In some cases, a first temporal offset may be changed to a second temporal offset based on identifying a timing pattern of the LED 207 when the LED 207 toggles between an on state and an off state.

The status of the images captured by the first camera 130 at the timing instants "t1," "t2," and "t3" are described above and shown as the image 225, image 230, and image 235. The status of the images captured by the second camera 305 at timing instants "t5," "t6," and "t7" are shown by an image 415, an image 420, and an image 425.

At timing instant "t5" the pulsed waveform 210 is in a high state thus causing the LEDs of the red warning light 106 to be in an on state. The image capture sequence 406 at timing instant "t5" corresponds to an exposure period and the imaging sensor in the second camera 305 captures an image 415. The image 415 captured by the camera 305 at the timing instant "t5" includes the red warning light 106 in an illuminated condition (all LEDs including the LED 207 are in an on state).

At timing instant "t6" the pulsed waveform 210 is in a high state thus causing the LEDs of the red warning light 106 to be in an on state. The image capture sequence 406 at timing instant "t6" corresponds to an exposure period and the imaging sensor in the camera 305 captures an image 420. The image 420 captured by the camera 305 at the timing instant "t6" includes the red warning light 106 in an illuminated condition (all LEDs including the LED 207 are in an on state).

At timing instant "t7" the pulsed waveform 210 is in a high state thus causing the LEDs of the red warning light 106 to be in an on state. The image capture sequence 406 at timing instant "t7" corresponds to an exposure period and the imaging sensor in the camera 305 captures an image 425. The image 425 captured by the camera 305 at the timing instant "t7" includes the red warning light 106 in an illuminated condition (all LEDs including the LED 207 are in an on state).

In this example, the temporal offset applied to the pulse trigger sequence 405 has resulted in the image 420 indicating that the red warning light 106 is in an illuminated condition even though the preceding image 230 captured by the first camera 130 indicates the red warning light 106 is in an unlit condition.

It is desirable in accordance with the disclosure for the imaging system controller 125 to evaluate the image 230 in comparison with other images, such as the image 415 and/or the image 420. In one example embodiment, an illumination condition of the LED 207 is based on comparing a first status of the LED 207 in the image 230 and a second status of the LED 207 in the image 235. In another example embodiment, an illumination condition of the red warning light 106 is based on comparing a first status of the red warning light 106 in the image 230 and a second status of the red warning light 106 in the image 235. In yet another example embodiment, an LED imaging artifact may be identified by a majority polling procedure applied to a preselected number of images, such as, for example, one image that is different in comparison to 10 other neighboring images over a time frame. The neighboring images may precede and/or succeed the image associated with the LED imaging artifact.

A time frame for evaluating the various images using any of the procedures indicated above can correspond, for example, to the time period 245, or can correspond to any other time period during which an adequate number of images have been captured. The time frame can also be selected on the basis of various factors, such as, for example, one or more image capture settings on the camera 130 and/or the camera 305, a frame repetition rate of the pulse trigger sequence 215, a frame repetition rate of the pulse trigger sequence 405, and/or an expected duration for the red warning light 106 to stay on. In some cases, if not known, the characteristics of these types of signals may be determined based on information obtained from other devices that are connected to the electrical grid.

In some implementations, individual images may be evaluated to identify whether banding features are present. Such banding features may suggest the occurrence of flicker at higher rates than exposure affecting intensity in rolling shutter in each camera image at each time of imaging.

Figure 5:
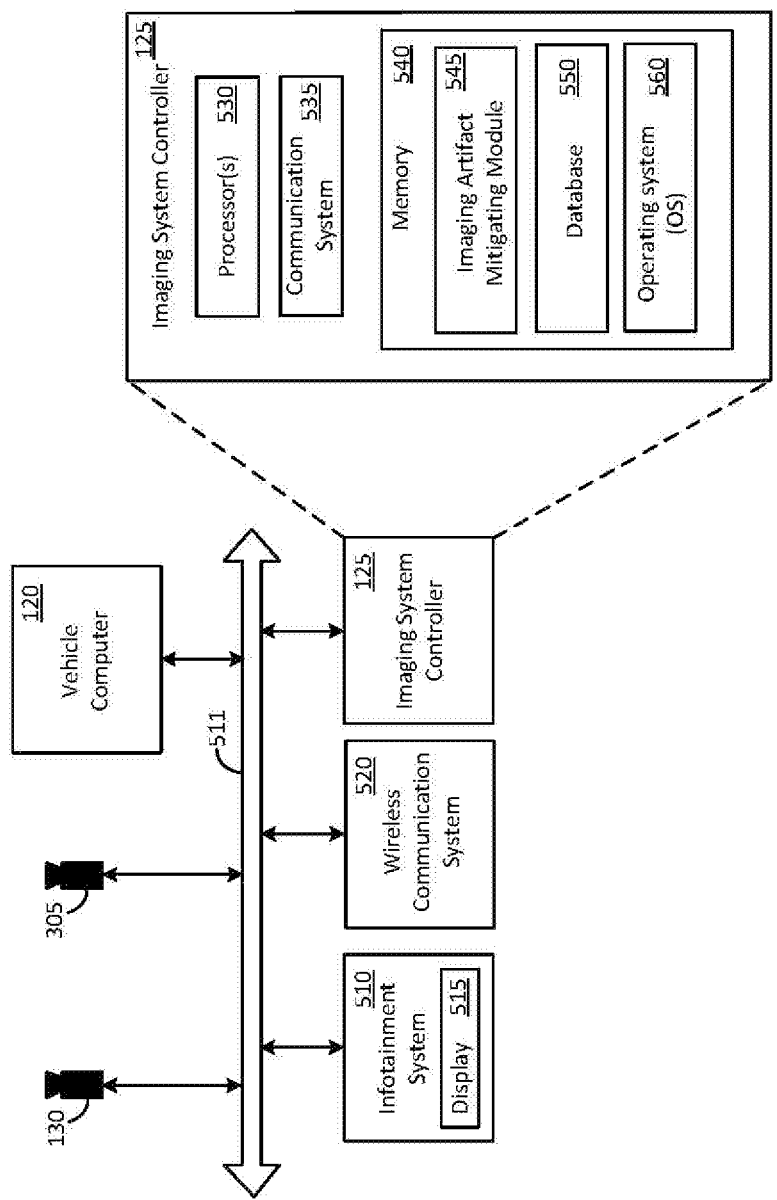
FIG. 5 shows some example components that may be included in the vehicle shown in FIG. 3.

FIG. 5 shows some example components that may be included in the vehicle 115. The example components can include the camera 130, the camera 305, the vehicle computer 120, an infotainment system 510, a wireless communication system 520, and the imaging system controller 125. The various components can be communicatively coupled to each other via one or more buses, such as an example bus 511. The bus 511 may be implemented using various wired and/or wireless technologies. For example, the bus 511 can be a vehicle bus that uses a controller area network (CAN) bus protocol, a Media Oriented Systems Transport (MOST) bus protocol, and/or a CAN flexible data (CAN-FD) bus protocol. Some or all portions of the bus 511 may also be implemented using wireless technologies, such as Bluetooth®, Ultra-Wideband, Wi-Fi, Zigbee®, or near-field-communications (NFC). For example, the bus 511 may include a Bluetooth® communication link that allows the imaging system controller 125 to wirelessly communicate with the camera 130 and/or the camera 305.

In an example implementation, the infotainment system 510 includes a display 515 that may be configured to display various types of information provided by the imaging system controller 125. In some implementations, the display 515 may include a graphical user interface (GUI) (or a human machine interface (HMI)) that may be used to accept input from an occupant of the vehicle 115, and also to display items, such as messages, icons, and/or soft keys.

The wireless communication system 520 can include various wireless communication nodes. In one example implementation, some or all of the wireless communication nodes can include a Bluetooth® low energy module (BLEM) and/or a Bluetooth® low energy antenna module (BLEAM).

The imaging system controller 125 may include a processor 530, a communication system 535, and a memory 540. The communication system 535 can include one or more wireless transceivers (BLEAMs, for example) that may be used for various purposes, such as, for example, to allow the imaging system controller 125 to transmit commands to the camera 130 and the camera 305 and to receive images captured by the camera 130 and the camera 305.

The memory 540, which is one example of a non-transitory computer-readable medium, may be used to store an operating system (OS) 560, a database 550, and various code modules, such as an imaging artifact mitigating module 545. The code modules are provided in the form of computer-executable instructions that can be executed by the processor 530 for performing various operations in accordance with the disclosure.

The imaging artifact mitigating module 545 may be executed by the processor 530 for performing various operations in accordance with the disclosure, such as, for example, identifying imaging artifacts in images captured by the camera 130 and/or the camera 305, and for determining an illumination condition of the traffic light 105.

In an example implementation, the database 550 may be used to store timing information related to various light sources, such as the traffic light 105, and information fetched from the server computer 145 and/or cloud storage system 140.

Figure 6:
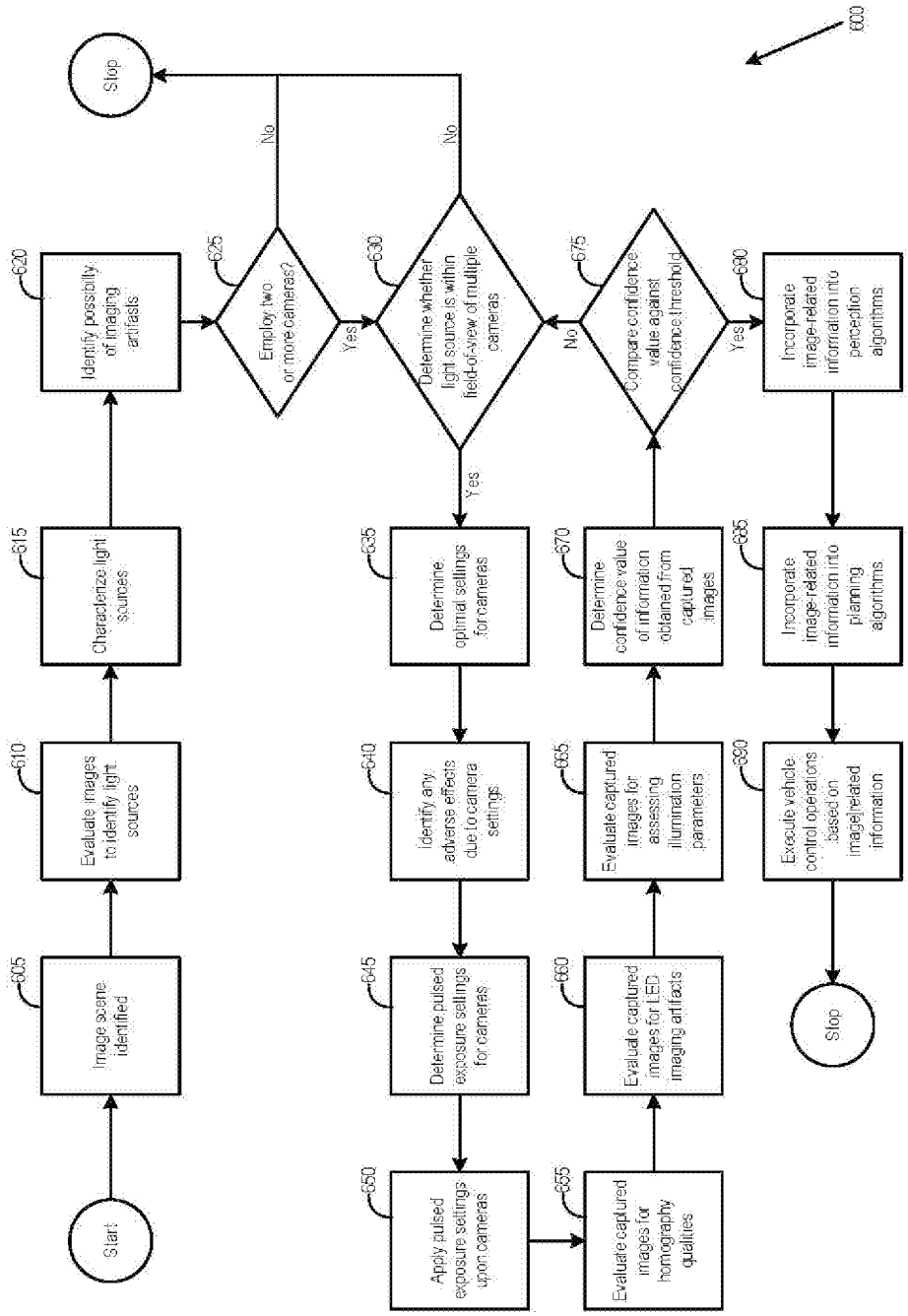
FIG. 6 shows a flowchart of a method to mitigate LED imaging artifacts in an imaging system in accordance with an embodiment of the disclosure.

FIG. 6 shows a flowchart 600 of an example method in accordance with the disclosure for mitigating imaging artifacts in images captured by an imaging system of a vehicle, such as the vehicle 115. The flowchart 600 illustrates a sequence of operations that can be implemented in hardware, software, or a combination thereof. In the context of software, the operations represent computer-executable instructions stored on one or more non-transitory computer-readable media, such as the memory 540, that, when executed by one or more processors, such as the processor 530, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 600 may be carried out by using the imaging system controller 125 and the communication system 535. The description below may make reference to certain components and objects shown in FIGS. 1-4, but it should be understood that this is done for purposes of explaining certain aspects of the disclosure and that the description is equally applicable to many other embodiments.

At block 605, an image scene may be identified. The identification may be made based on various factors, such as, for example, to assist the vehicle 115 move along a road. In this case, the imaging system controller 125 may communicate with the camera 130 and/or the camera 305 to capture images of various objects as the vehicle 115 moves along the road. For example, the camera 130 and/or the camera 305 may be activated to capture a set of images and/or a video clip of an image scene ahead of the vehicle 115.

At block 610, the imaging system controller 125 may begin evaluating the images to characterize various light sources that may be present in the images and/or artifacts indicating LED flicker during rolling shutter image capture or within a single image that indicates the presence of off states.

At block 615, the evaluation performed by the imaging system controller 125 may involve characterizing various light sources as unvarying light sources (for example, a street lamp that stays on continuously) or light sources that turn on and off at a rapid rate (such as, for example, the traffic light 105). Characterizing may further involve identifying light sources that are relevant to the vehicle 115 (such as the traffic light 105) versus light sources that are deemed irrelevant (such as a light that illuminates a poster located beside the road).

At block 620, evaluation performed by the imaging system controller 125 may involve identifying a possibility of having to deal with imaging artifacts that may be present in one or more light sources (such as the traffic light 105, which contains LEDs that toggle on and off in the manner described above and may produce imaging artifacts).

At block 625 a determination may be made whether to employ two or more cameras for mitigating imaging artifacts. Mitigating operations may be terminated if deemed unnecessary, such as, for example, to set a longer exposure during an overcast day or to reduce an exposure during a very sunny day. In some cases, a longer exposure setting may lead to more cycles of LED on-off cycles being captured. If mitigating operations are deemed necessary, at block 630, a determination may be made whether the light source (such as the traffic light 105) is within a field-of-view of two or more cameras mounted on the vehicle 115 (such as the camera 130 and the camera 305).

In some cases, further operations may be terminated if the light source is not within the field-of-view of the two or more cameras. In some other cases, where a light source is within field-of-view of a single camera but not within field-of-view of the two or more cameras, mitigating operations described above with respect to images captured by a single camera, such as the camera 130, may be carried out. Such mitigation operations may include using a longer duration exposure to capture a potential light source at one or more on cycles while accepting undesirable saturation of the sensor. Another example may be to perform sub-window capture of the detected light source to increase the image capture rate to improve the probability of capturing the on cycle of any suspected light source. In other cases, the single camera may detect image frames with on light source states and image frames with off light source states that may require the use of filtering via hidden Markov model, use of sequential Monte Carlo methods, exact Kalman filter, particle filter, etc. These mitigation strategies may further inform sensor fusion strategies and planning logic. In some cases, this may result in feature deactivation, such as deactivation of traffic sign recognition visual alerts in a display.

If the light source is within the field-of-view of the two or more cameras, at block 635, optimal settings for the two or more cameras (exposure times, temporal offset, etc. for example) can be determined. This operation may include feature-homography (via operations such as ransac, transform, correction for exposure/brightness global difference, and image subtract) followed by subtraction to identify anomalies. A confidence threshold may be used in some cases to evaluate the anomalies.

In some applications, a determination may be based on a relative, numerically-weighted comparison using characteristics that may include current exposure time, current weather patterns, or other atmospheric conditions (e.g., a sunny day vs. a cloudy day), and other factors. For example, during an overcast day, a nominal exposure time for a camera may be substantially longer in duration as compared with a bright sunny day. A relatively long duration image exposure may increase a probability associated with obtaining a correct light state for a light source in the captured images. By comparison, on a sunny day, the exposure time may be relatively short such that the image is not overexposed and light-saturated.

At block 640, the imaging system controller 125 may identify any adverse effects caused by the settings determined in block 635. For example, the imaging system controller 125 may identify that a particular exposure setting may lead to excessive imaging artifacts being present in the images captured by the camera 130 and/or the camera 305.

At block 645, the imaging system controller 125 may determine a first pulsed trigger mode of operation for the first camera 130. The first pulsed trigger mode of operation involves the application of the pulse trigger sequence 215 and the image capture sequence 216 to the camera 130. The imaging system controller 125 may also determine a second pulsed trigger mode of operation for the second camera 305. The second pulsed trigger mode of operation involves the application of the pulse trigger sequence 405 and the image capture sequence 406 to the camera 305.

Various aspects related to the first pulsed trigger mode of operation and/or the second pulsed trigger mode of operation may involve identifying and accepting a trade-off between performance and ability of other perception algorithms to detect the true state of light sources. For example, changes to exposure settings may negatively impact individual image quality resulting in reduction in computer vision performance in object detection. In other cases, the cameras exposure may not be temporal aligned, thereby resulting in errors associated with relative object motion in the image frame, e.g. optical flow, creating additional errors in depth estimation. The negative effects of operating the camera 105 and/or the camera 305 under non-ideal exposure settings may be expressed in terms of some arbitrary cost scale, e.g. 1 to 11, based on engineering knowledge for a range of ideal to non-ideal exposure settings that is predicted to obtain the most temporal coverage of light pulses. This process may further analyze the exposure settings associated with rolling shutter cameras, e.g. CMOS, wherein individual rows of the camera may be exposed at differing times relative to other rows. A compounding procedure may be used in some cases, wherein camera rows may cover differing field of views, e.g. forward-looking camera and surround view cameras, so row 100 of one camera and row 500 of another camera may provide images of the same light source.

At block 650, the pulse trigger sequence 215 and the image capture sequence 216 to the camera 130 are applied to the camera 130 and/or the pulse trigger sequence 405 and the image capture sequence 406 are applied to the camera 305. The camera 130 and/or the camera 305 are then operated for capturing images, such as the images shown in FIG. 2 and/or FIG. 4.

At block 655, the imaging system controller 125 may evaluate the captured images with respect to homography. Such evaluation may include evaluating an image where there is a temporal delay and/or more complex homography (unaligned cameras) in two images. A homography approach may be used to ensure matching individual pixels even under relative motion. The homography approach may also be applied over multiple images (captured by a single camera or by multiple cameras) to track a given light source location in pixel space over time to identify on/off states over time. The pixel space may further be brought into 3D space by techniques such as Simultaneous Localization and Mapping (SLAM), combined stereo, and temporal stereo structure from motion (SFM). The imaging system controller 125 may also evaluate a quality of various types of homographic matches.

At block 660, the imaging system controller 125 may evaluate the captured images to identify LED imaging artifacts in pixel space and/or 3D space.

At block 665, the imaging system controller 125 may evaluate the captured images to assess various illumination parameters, such as, for example, illumination parameters associated with the red warning light 106. Assessing such parameters may be based on ensuring that information provided by the pertaining red warning light 106 (stop indication) is discernible.

At block 670, the imaging system controller 125 may determine a confidence value of information derived from images captured of one or more light sources over various time frames, such as, for example, various image capture frames and/or the time period 245 (shown in FIG. 2 and FIG. 4) that corresponds to a duration of the red warning light 106 being illuminated.

At block 675, the imaging system controller 125 may compare the confidence level against a confidence threshold.

At step 680, responsive to determining that the confidence threshold is met, the imaging system controller 125 may incorporate image-related information into one or more perception algorithms for purposes, such as overriding a present determination (for example, a most recent image frame evaluation result), as well as informing sensor fusion and planning logic in the imaging system controller 125. For example, if the most recent set of image frames captured by the camera(s) indicate that a camera is off on most frames but the confidence level determination made in accordance with the disclosure (for example, <0.4) indicates otherwise (e.g. the light source on/off state is predicted as on and the pulse characteristics predicted indicate that the exposure time period and light source time periods do not overlap) then the imaging system controller 125 may inform the planning algorithm of a software program that the light is presently on (e.g. traffic light state is a red light). In such cases, the software program may predict the path and motion plan of other vehicles on the basis of a red light state and actuate a display in the vehicle 115 accordingly (for example, display a a traffic light icon indicating a red light on the display screen of an infotainment system), provide a braking warning, and/or actuate braking while in a autonomous/semi-autonomous operation. In another example, the confidence level may be high, (for example, >0.7) thereby indicating that the image frame state, e.g. all light signals are off, matches that of the true state, a result derived by using a perception algorithm may remain unaltered and thus inform other algorithms/logic, e.g. planning logic, resulting in a different set of vehicle actuation, e.g. deactivation of low speed stop and go semi-autonomous vehicle operations on the basis of a traffic condition that is out of the scope of the features safe operation conditions as defined by the manufacturer.

At step 685, the imaging system controller 125 may incorporate image-related information into one or more planning prediction algorithms, e.g. prediction of other vehicle path and motion plans, and planning algorithms for purposes, such as motion, path, evaluating, or strategizing.

At step 690, the imaging system controller 125 may cooperate with the vehicle computer 120 to execute one or more vehicle control actions. For example, the vehicle 115 may continue moving forward through the traffic light 105 or stop at the traffic light 105 based on the illumination status of the red warning light 106 and/or the green light 107.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 540, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
capturing, by a first camera of an imaging system, a first image of a light source comprising a light-emitting diode (LED) that toggles between an on state and an off state, the first camera configured to capture images under control of a first pulse trigger sequence that is a part of a first pulsed trigger mode of operation;
capturing, by a second camera of the imaging system, a second image of the light source, the second camera configured to capture images under control of a second pulse trigger sequence that is a part of a second pulsed trigger mode of operation, the second pulse trigger sequence having a temporal offset with respect to the first pulse trigger sequence;
determining an illumination condition of the LED based on comparing a first status of the LED in the first image and a second status of the LED in the second image; and
modifying at least one of the first pulse trigger sequence, the second pulse trigger sequence, or the temporal offset, based on a confidence threshold.

2. The method of claim 1, wherein the first pulsed trigger mode of operation comprises a first exposure time period and a first readout time period, the second pulsed trigger mode of operation comprises a second exposure time period and a second readout time period that is substantially identical to the first exposure time period and the first readout time period respectively.

3. The method of claim 2, wherein the light source is one of a traffic light, a road sign, a pedestrian sign, or a light mounted on a vehicle.

4. The method of claim 1, wherein the temporal offset between the second pulse trigger sequence and the first pulse trigger sequence is fixed over a period of time.

5. The method of claim 1, wherein the temporal offset between the second pulse trigger sequence and the first pulse trigger sequence is one of a periodically varied temporal offset or an intermittently varied temporal offset.

6. The method of claim 1, further comprising:
determining that the light source is on when at least one of the first status of the LED or the second status of the LED indicates the on state of the LED.

7. A method comprising:
capturing, by a first camera of an imaging system, a first image of a light source comprising a light-emitting diode (LED) that toggles between an on state and an off state, the first image showing the LED in the on state;
capturing, by a second camera of the imaging system, a second image of the light source, the second image showing an imaging artifact wherein the LED is in the off state, wherein the first camera is configured to capture images under control of a first pulse trigger sequence that is a part of a first pulsed trigger mode of operation and the second camera is configured to capture images under control of a second pulse trigger sequence that is a part of a second pulsed trigger mode of operation, the second pulse trigger sequence having a first temporal offset with respect to the first pulse trigger sequence;
changing the first temporal offset to a second temporal offset based on a homographic criterion; and
determining that the light source is in an on condition based on the first image showing the LED in the on state.

8. The method of claim 7, wherein the first camera is configured to capture images under control of a first pulse trigger sequence that is a part of a first pulsed trigger mode of operation and the second camera is configured to capture images under control of a second pulse trigger sequence that is a part of a second pulsed trigger mode of operation, the second pulse trigger sequence having a first temporal offset with respect to the first pulse trigger sequence.

9. The method of claim 8, wherein the light source is one of a traffic light, a road sign, a pedestrian sign, or a light mounted on a vehicle.

10. The method of claim 8, further comprising:
identifying a timing pattern of the LED that toggles between the on state and the off state; and
changing the first temporal offset to a second temporal offset based on identifying the timing pattern of the LED.

11. The method of claim 10, further comprising:
fetching the timing pattern of the LED by wirelessly communicating with a cloud storage system.

12. The method of claim 10, further comprising:
modifying at least one of the first pulse trigger sequence, the second pulse trigger sequence, the first temporal offset, or the second temporal offset, based on a confidence threshold.

13. An imaging system of a vehicle, the imaging system comprising: a first camera;
a second camera; and a controller, the controller comprising:
a memory that stores computer-executable instructions; and
a processor configured to access the memory and execute the computer-executable instructions to at least:
operate the first camera to capture a first image of a light source comprising a light-emitting diode (LED) that toggles between an on state and an off state;
detect, in the first image, that the LED is in the on state;
operate the second camera to capture a second image of the light source; detect, in the second image, an imaging artifact wherein the LED is in the off state, wherein the first camera is configured to capture images under control of a first pulse trigger sequence that is a part of a first pulsed trigger mode of operation and the second camera is configured to capture images under control of a second pulse trigger sequence that is a part of a second pulsed trigger mode of operation, the second pulse trigger sequence having a first temporal offset with respect to the first pulse trigger sequence;
change the first temporal offset to a second temporal offset based on a homographic criterion; and
determine that the light source is in an on condition based on the first image showing the LED in the on state.

14. The imaging system of claim 13, wherein the processor is further configured to access the memory and execute the computer-executable instructions to:
apply a first pulse trigger sequence upon the first camera for capturing the first image, wherein the first pulse trigger sequence is a part of a first pulsed trigger mode of operation; and
apply a second pulse trigger sequence upon the second camera for capturing the second image, wherein the second pulse trigger sequence is a part of a second pulsed trigger mode of operation and has a first temporal offset with respect to the first pulse trigger sequence.

15. The imaging system of claim 14, wherein the light source is one of a traffic light, a road sign, a pedestrian sign, or a light mounted on a second vehicle.

16. The imaging system of claim 14, wherein the processor is further configured to access the memory and execute the computer-executable instructions to:
determine a second temporal offset that eliminates the imaging artifact in the second image; and
eliminate the imaging artifact in the second image by applying the second temporal offset between the first pulse trigger sequence and the second pulse trigger sequence.

17. The imaging system of claim 14, wherein the processor is further configured to access the
memory and execute the computer-executable instructions to:
identify a timing pattern of the LED that toggles between the on state and the off state; and
change the first temporal offset to a second temporal offset based on identifying the timing pattern of the LED.

18. The imaging system of claim 17, wherein the processor is further configured to access the memory and execute the computer-executable instructions to:
fetch the timing pattern of the LED by wirelessly communicating with a cloud storage system.

* * * * *